(12) United States Patent
Jones et al.

(10) Patent No.: US 11,473,398 B1
(45) Date of Patent: Oct. 18, 2022

(54) FLUIDS HAVING INCREASED MAGNETIC PERMEABILITY FOR SUBTERRANEAN TOOL ACTIVATION

(71) Applicant: Halliburton Energy Services, Inc., Houston, TX (US)

(72) Inventors: Paul J. Jones, Humble, TX (US); Gregory T. Werkheiser, Huntsville, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/217,250

(22) Filed: Mar. 30, 2021

(51) Int. Cl.
*E21B 33/14* (2006.01)
*E21B 33/138* (2006.01)
*C09K 8/42* (2006.01)

(52) U.S. Cl.
CPC .......... *E21B 33/14* (2013.01); *E21B 33/138* (2013.01); *C09K 8/424* (2013.01)

(58) Field of Classification Search
None
See application file for complete search history.

(56) References Cited

U.S. PATENT DOCUMENTS

| 9,840,902 | B2 | 12/2017 | Nguyen |
| 10,370,952 | B2 | 8/2019 | Jamison et al. |
| 2003/0029611 | A1 | 2/2003 | Owens |
| 2003/0192695 | A1 | 10/2003 | Dillenbeck et al. |
| 2013/0292177 | A1 | 11/2013 | Meurer et al. |
| 2014/0118157 | A1* | 5/2014 | Jamison ............. E21B 47/12 340/854.6 |
| 2015/0252243 | A1* | 9/2015 | Ojong-Besong ....... C09K 8/467 524/5 |
| 2021/0002975 | A1 | 1/2021 | Sen et al. |
| 2021/0041591 | A1 | 2/2021 | Riachentsev et al. |

FOREIGN PATENT DOCUMENTS

WO 2017155529 A1 9/2017

OTHER PUBLICATIONS

International Search Report and Written Opinion dated Dec. 1, 2021; International PCT Application No. PCT/US2021/025081.

\* cited by examiner

*Primary Examiner* — Andrew Sue-Ako
(74) *Attorney, Agent, or Firm* — McGuireWoods LLP (57) ABSTRACT

Fluid flows, such as slurries, conditioning fluids, spacer fluids, or the like, may be modified to carry materials having high magnetic permeability characteristics that can be detected by a magnetic permeability sensing apparatus positioned along the fluid flow path in wellbores or downhole tools. Sensed presence of the high magnetic permeability material by the sensing apparatus positioned in the fluid flow path may result in initiation of an operational event. The operational event may include, but not limited to closing or opening a valve, moving a component, conveying a signal, activating or deactivating a device, or the like.

20 Claims, 4 Drawing Sheets

FLUIDS HAVING INCREASED MAGNETIC PERMEABILITY FOR SUBTERRANEAN TOOL ACTIVATION

The present disclosure relates generally to methods, compositions, and apparatuses for detecting changes in magnetic permeability of fluid flows in well operations for producing gas or oil, among other features.

BACKGROUND

Fluid or cementing operations such as reverse circulation cementing (hereinafter "reverse cementing") operations typically involve displacing fluids between the outside of a casing and a formation wall in a subterranean well operation. A sensor positioned at or near the bottom of a well which may be on the casing detects when the cementing fluids reach the bottom of the well. In response, a signal is generated to close a valve to prevent cementing fluids from ascending inside of the casing. During reverse cementing operations, the cementing fluids may be aided by gravity to reach the bottom of the wellbore.

BRIEF DESCRIPTION OF THE DRAWINGS

The accompanying drawings, which are included to provide a further understanding of the disclosure, are incorporated in and constitute a part of this specification, illustrate embodiments of the disclosure and, together with the detailed description, serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

A computer, as used in this disclosure, means any machine, device, circuit, component, or module, or any system of machines, devices, circuits, components, modules, or the like, which are capable of manipulating data according to one or more instructions, which may be embodied as logic code.

The terms including, comprising and variations thereof, as used in this disclosure, mean including, but not limited to, unless expressly specified otherwise.

The terms "a", "an", and "the", as used in this disclosure, means "one or more", unless expressly specified otherwise.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Overview

Fluid flows, such as, e.g., slurries, conditioning fluids, spacer fluids, or the like, may be modified to carry materials having high magnetic permeability characteristics that can be detected by a magnetic permeability sensor apparatus ("sensing apparatus") positioned along the fluid flow path. Sensed presence of the high magnetic permeability material by the sensing apparatus positioned in the fluid flow path, such as positioned downhole in a wellbore, may result in initiation of an operational event. The operational event may include, but not limited to, closing or opening a valve, opening or closing a sleeve, moving a component, conveying a signal, activating or deactivating a device, or the like.

Further, the sensing apparatus and associated electronics may be configured to recognize a plurality of changes in magnetic permeability within the fluid flow, such as changing from a high magnetic permeability to a low magnetic permeability. Conversely, the sensing apparatus and associated electronics may be configured to recognize a plurality of changes in magnetic permeability within the fluid flow, such as changing from a low magnetic permeability to a high magnetic permeability, perhaps repeatedly. In this way, a technique is provided of signaling via the changing property of the fluid flow to the sensing apparatus, and possibly any devices connected to the sensing apparatus, for initiating a particular function, such as opening or closing a valve, moving a component, activating/deactivating a device, initiating a series of functions, or the like. The signaling via the fluid flow may be simple or relatively involved depending on the messaging scheme employed.

Example Illustrations

Figure 1:
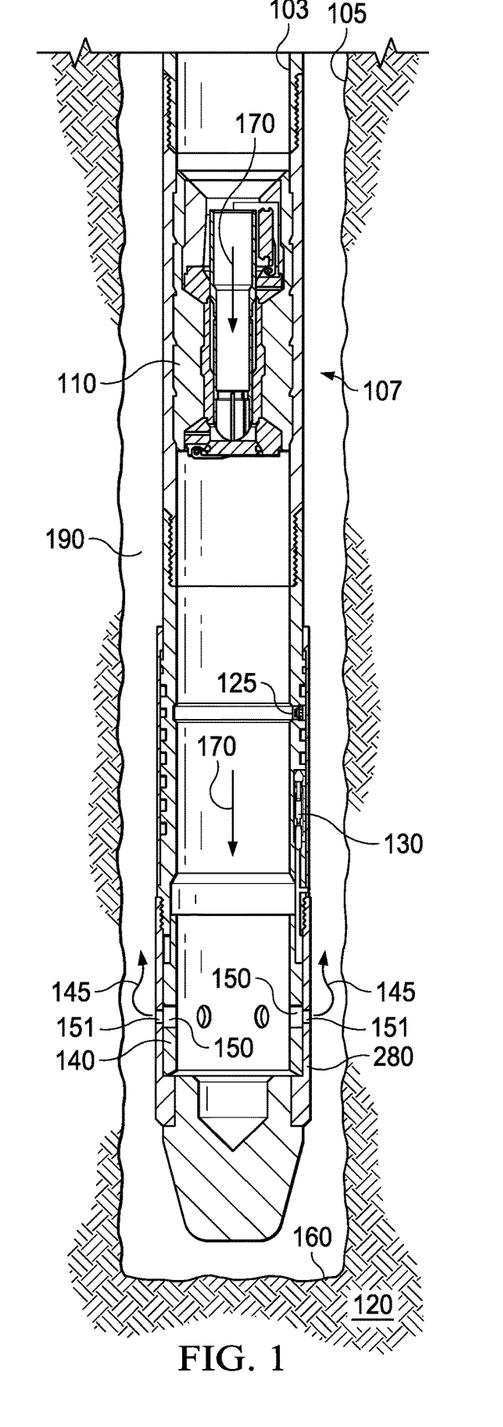
FIG. 1 is an illustration of an example downhole tool positioned in a wellbore for well conditioning, configured according to principles of the disclosure.

FIG. 1 is an illustration of an example downhole tool 107 positioned in a wellbore 105, for well conditioning. The example downhole tool 107 comprises a sliding sleeve 280 and double flapper valve assembly 110, and is shown positioned proximate a bottom 160 of the wellbore 105 within subterranean formation 120. In embodiments, there may be one or more joints of casing between the sliding sleeve 280 and the double flapper valve assembly 110. The downhole tool 107 is shown at the end of a well casing 103. Fluid flow 170 flows from the surface, downward through well casing 103 into the downhole tool 107 and out the one or more ports 150 into the annulus 190 as fluid flow 145. Sensing apparatus 125 is positioned in operational sensing range of the fluid flow within the downhole tool 107, as explained more below. An actuator mechanism 130 is connected to the sliding sleeve 140 for activating the sliding sleeve 140. The sliding sleeve 140 when opened permits fluid flow 170 to exit out ports 150 as fluid flow 145 into the annulus 190. However, when closed, the sliding sleeve 140 prevents fluid flow 170 from exiting ports 150 so that fluid flow 145 no longer flows into the annulus 190. The activator mechanism 130 is communicatively coupled to the sensing apparatus 125, and the activator mechanism 130 is responsive to a signal from the sensing apparatus 125. The double flapper assembly 110 is preconfigured to permit passage of fluid flow in a particular direction, in this example, permitting flow downhole through the downhole tool 107 while preventing fluid flow in the reverse direction.

Figure 2:
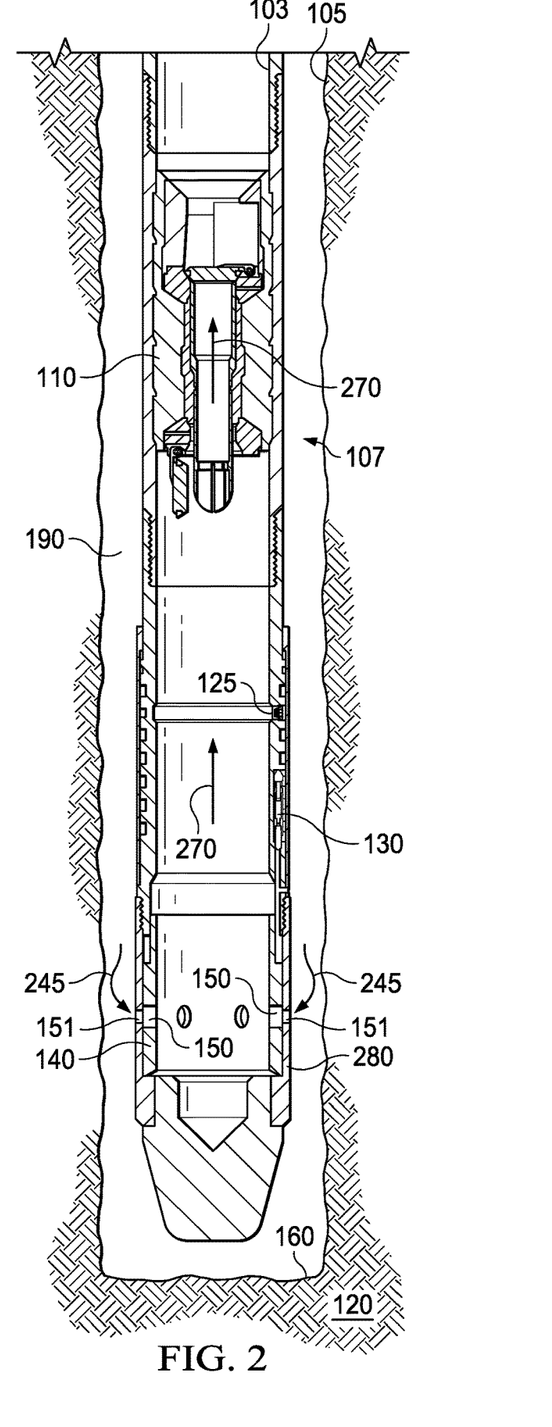
FIG. 2 is an illustration of another example downhole tool positioned in a wellbore for reverse cementing, configured according to principles of the disclosure.

FIG. 2 is an illustration of another example downhole tool positioned in a wellbore for reverse cementing, configured according to principles of the disclosure. The example downhole tool 107 of FIG. 2 comprises a sliding sleeve 280 and double flapper valve assembly 110, and is shown positioned proximate a bottom 160 of the wellbore 105 within subterranean formation 120. The downhole tool 107 is shown at the end of a well casing 103, but could be another oilfield tubular. The double flapper valve assembly 110 is configured to permit passage of fluid in one direction, which, in this example, is in the uphole direction.

Figure 3:
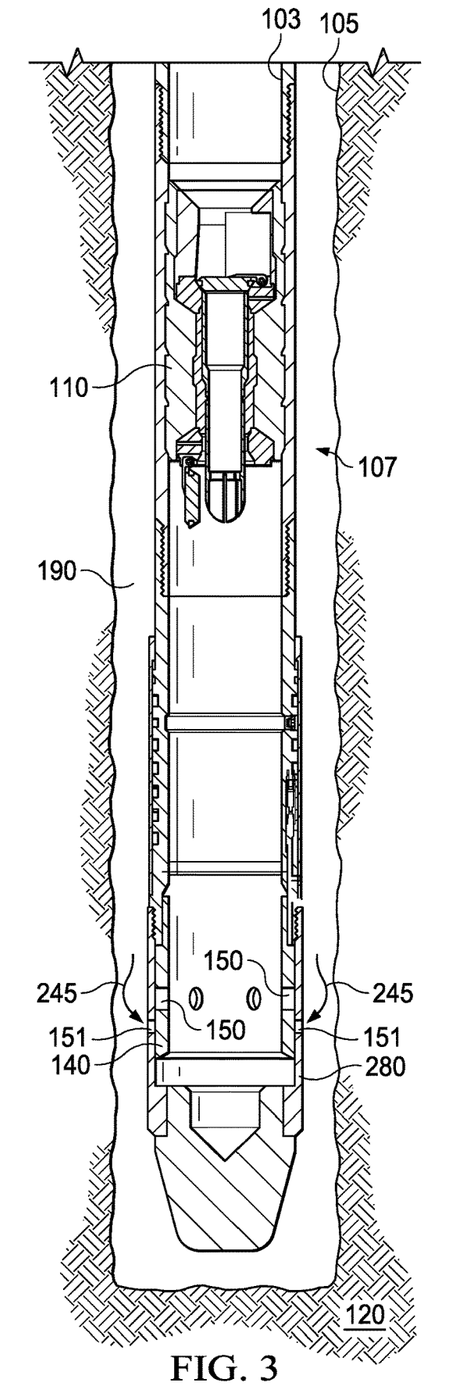
FIG. 3 is an illustration of the downhole tool of FIG. 2 in a state at the end of reverse cementing, configured according to principles of the disclosure.

In FIG. 2, fluid flow is shown flowing 245 from the annulus 190 into the downhole tool 107 through ports 151 and 150, and back uphole. The fluid may be a slurry and is typically supplied by pumps at the surface. In this example, the sliding sleeve 280 is in an open state to permit the fluid flow 145 to enter the downhole tool 107 through ports 151 and 150 and permitting the fluid flow to travel uphole through the downhole tool 107, shown as fluid flow 270. The sliding sleeve 280 is considered to be in an open state when the ports 150 and 151 align thereby permitting fluid to pass through the ports. The sliding sleeve 280 is considered to be in a closed state when the ports 150 and 151 do not align thereby blocking fluid flow, as shown in FIG. 3. In reverse cementing operations, the sensing apparatus 125 is configured to detect the presence, absence or changes in magnetic permeability of the fluid flowing within the downhole tool 107, and is configured to control the state of the sliding sleeve 280 thereby controlling the flow of fluids through the downhole tool 107 and controls the amount of fluid. Alternatively, the sensing apparatus 125 could be positioned at other locations of the well casing.

In this manner, fluids, such as cementing fluids, or other fluids described herein, may flow through the annulus, adjacent to the subterranean formation 120 into the flow port 150 after which it may be detected by the sensing apparatus 125. The sensing apparatus 125 detects high magnetic permeability material present in the cementing fluids. High magnetic permeability material may be added to the cementing fluids typically at the surface. Upon detection of the high magnetic permeability material, the sensing apparatus 125 may initiate closing of the sliding sleeve 140 by activating the actuator mechanism 130. This results in the sliding sleeve 140 moving to a closed position as shown in FIG. 3. In a reverse cementing scenario, the detection of the high magnetic permeability material by the sensing apparatus 125 is effectively an end-of-job event for which the cement flow stops.

In FIG. 3, the sliding sleeve 140 is repositioned to a close state, which stops the fluid flow 245 from entering the one or more flow ports 150. In FIG. 3, the ports 150 and 151 do not align thereby preventing fluid flow 245 in the annulus 190 from entering the downhole tool 107. Hence, fluid is prevented from flowing uphole through the downhole tool 107. In contrast, in FIG. 2, ports 150 and 151 do align permitting fluid to enter the downhole tool 107 from the annulus 190 and then onward uphole through the downhole tool 107. If, in FIG. 3, the fluid flow comprises cement, the cement only rises to approximately the height of the sensing apparatus 125 inside of the downhole tool 107. In this manner, the cement remains located within the annulus, while little or no cement enters the interior of the casing 103. In other embodiments, the sensing apparatus 125 may be positioned at other locations along the well casing 103.

Figure 4A:
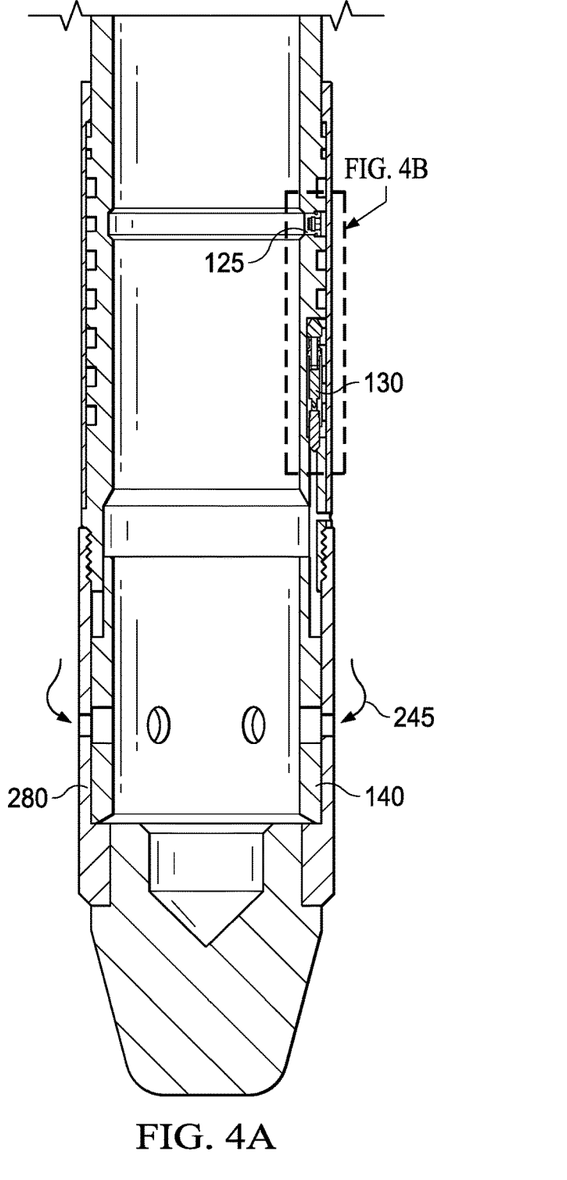
FIG. 4A is a close-up view of a downhole tool comprising a sliding sleeve, configured according to principles of the disclosure.
Figure 4B:
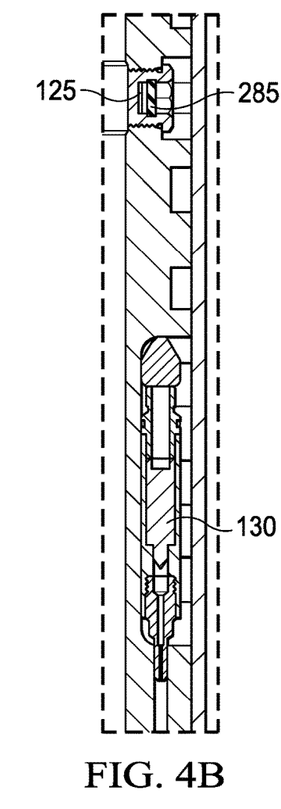
FIG. 4B is a close-up view of certain components of the sliding sleeve of FIG. 4A.

FIG. 4A is a close-up view of a down hole tool comprising a sliding sleeve such as shown in any of the preceding figures, configured according to principles of the disclosure. FIG. 4B is a close-up view of certain components of the downhole tool of FIG. 4A. The sensing apparatus 125 may be positioned along a wall of the downhole tool 107 so that the magnetic sensing ability of the sensing apparatus can induce a magnetic field into the downhole tool interior. A plug 285 comprising non-ferromagnetic material may be positioned between the sensing apparatus and the fluid flow that may occur within the downhole tool 107 thereby protecting or shielding the sensing apparatus from the fluid itself. The non-ferrous material may be, e.g., austenitic steel, titanium, polymers, composites, aluminum, or any alloys thereof. In this way, the plug 285 creates a window into the interior of the downhole tool 107, and may also hold the sensing apparatus in place. The sensing apparatus 125 may be coupled to the actuator mechanism 130 so that a signal can be conveyed to actuate the sliding sleeve 140.

Figure 5:
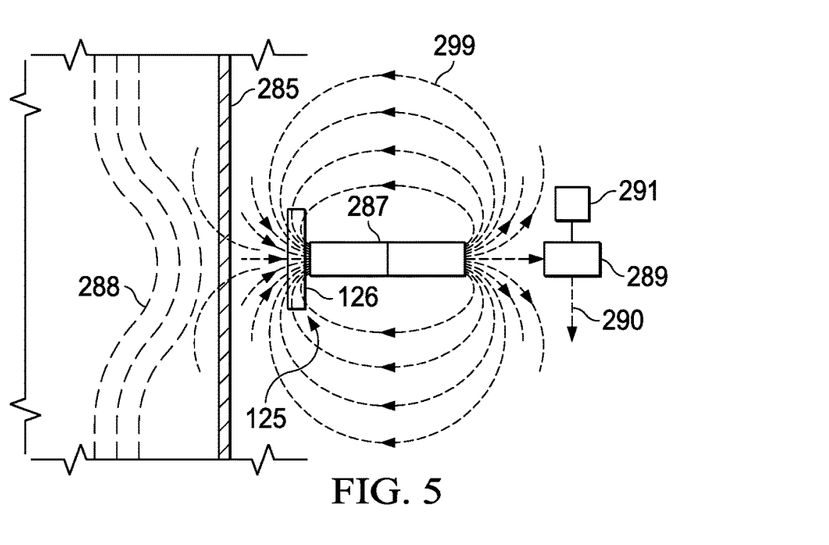
FIG. 5 is an illustration of generalized operational components related to the sensing apparatus of FIGS. 4A and 4B.

FIG. 5 is an illustration of generalized operational components related to the sensing apparatus of FIGS. 4A and 4B. The sensing apparatus 125 comprises a magnetic 287 that can be an electromagnet or a permanent magnet, and a magnetic sensor 126. The slurry 288, or any other fluid flow such as flow 270, is separated from the magnetic 287 by plug 285, which provides a barrier between the slurry 288 and the electronic components. The magnet can project a magnetic field past the plug 285 into the slurry 288. The slurry 288, as well as fluid 270, may be a low-permeability slurry or a high-permeability slurry, or may be an ambient fluid downhole, e.g., a completion brine or a drilling fluid.

Embodiments of the spacer fluids may include a spacer additive that includes high magnetic permeability particles. Examples of high magnetic permeability particles may include, but are not limited to, magnetite, ilmenite, hematite, maghemite, mu-metal, iron filings, powdered metal, or combinations thereof. The high magnetic permeability particles may have a magnetic permeability of about, but not limited to, $1.3*10^{-6}$ H/m to about $1.0*10^0$ H/m. In specific embodiments the high magnetic permeability particles may have a magnetic permeability from about $2.7*10^{-6}$ H/m to about $2.7*10^{-5}$ H/m.

Embodiments of the spacer fluids may include a spacer additive that includes high magnetic susceptibility particles. Examples of high magnetic susceptibility particles may include, but are not limited to, magnetite, ilmenite, hematite, maghemite, mu-metal, iron filings, powdered metal, or combinations thereof. The high magnetic susceptibility particles may have a magnetic susceptibility of about, but not limited to, $0.5*10^{-3}$ to about $800000*10^{-3}$. In specific embodiments the high magnetic susceptibility particles may have a magnetic susceptibility from about $300*10^{-3}$ to about $20000*10^{-3}$.

Embodiments of the spacer fluids may include a spacer additive that includes a biopolymer gum. Examples of suitable biopolymer gums may include, but are not limited to, xanthan gum, diutan gum, welan gum, scleroglucan gum, and combinations thereof. The biopolymer gum may be present in the spacer additive in any suitable amount, including, but not limited to, an amount of about 0.1 wt % to about 10 wt % based on a total weight of the spacer additive. In specific embodiments, the solid scouring material may be present in an amount of about 1 wt % to about 5 wt % or from about 2 wt % to about 3 wt % based on a total weight of the spacer additive. In a specific example, the biopolymer gum may be present in the spacer additive in an amount of about 97.6 wt % based on a total weight of the spacer additive. One of ordinary skill in the art, with fixe benefit of this disclosure, should be able to select an appropriate concentration for the biopolymer.

Embodiments of the spacer fluids may include a solid surfactant composite, which may include a surfactant and a solid carrier. Optionally, the solid surfactant composite may include a dispersant, a defoaming agent, or a combination thereof. The solid surfactant composite may have a wide variety of shapes and sizes of individual particles suitable for use in well applications. By way of example, individual particles of the solid surfactant composite may have well-defined physical as well as irregular geometries, including the physical shape of platelets, shavings, fibers, flakes, ribbons, rods, strips, spheroids, hollow beads, toroids, pellets, tablets, or any other physical shape. Without limitation, the solid surfactant composite may have a mean particle size in the range of about 5 microns to about 1,500 microns and, alternatively, a mean particle size in the range of about 20 microns to about 500 microns. However, particle sizes outside these defined ranges also may be suitable for particular applications.

The solid surfactant composite may be included in the spacer dry blend in any suitable amount. In some embodiments, the solid surfactant composite may be included in the spacer dry blend in an amount of about 0.1 wt % to about 10 wt % based on a total weight of the spacer dry blend. In specific embodiments, the spacer dry blend may be present in an amount of about 1 wt % to about 10 wt %, about 1 wt % to about 5 wt %, or about 2 wt % to about 5 wt % based on a total weight of the spacer dry blend.

The spacer fluids generally should have a density suitable for a particular application as desired by those of ordinary skill in the art, with the benefit of this disclosure. In some embodiments, the spacer fluids may have a density in the range of from about 4 pounds per gallon ("lb/gal") (480 kg/m$^3$) to about 24 lg/gal (2900 kg/m$^3$). In other embodiments, the spacer fluids may have a density in the range of about 4 lb/gal (480 kg/m$^3$) to about 17 lb/gal (2040 kg/m$^3$). In yet other embodiments, the spacer fluids may have a density in the range of about 8 lg/gal (960 kg/m$^3$) to about 13 lb/gal (1600 kg/m$^3$). Embodiments of the spacer fluids may be foamed or unfoamed or include other means to reduce their densities known in the art, such as lightweight additives. Those of ordinary skill in the art, with the benefit of this disclosure, will recognize the appropriate density for a particular application.

The magnetic sensor 126 can detect ranges of magnetic strength (i.e., determine that measurement satisfies a detection criteria) for both high-permeability slurries and low-permeability slurries. As part of the sensing apparatus 125, the magnetic sensor 126 is commutatively coupled to a computing device 281. A power source 291 such as a battery may be provided as part of the sensing apparatus 125, alternatively, as part of the computing device 281. Also, as part of the sensing apparatus 125, computing device 281 is capable of signaling 290 the actuating device 130, and the computing device 281 may be configured to analyze any detected repeated one or more intervals of high-permeability slurries and low-permeability slurries and configured to determine the encoding of any signaling that may be conveyed by the repeated intervals. In embodiments, the magnetic sensor 126 may be any magnetic sensor capable of detecting changes in magnetic permeability. In embodiments, the sensing apparatus 125 may be in communication with the surface and provide one or more signals upon detecting a transition from high-magnetic permeability fluid flow to a low-magnetic permeability fluid flow, or the converse, from low to high magnetic permeability fluid flow.

In general, according to principles of the disclosure, treatment fluids with increased magnetic permeability can be pumped downhole such as into the annulus of a well. At a location within the casing a sensing apparatus may measure the magnetic field and determine a change indicating a change in fluid properties. When a fluid with increased magnetic permeability flows past the sensor apparatus, alteration of the magnetic field is detected and an event may be initiated such as closing a valve, sending a signal, activating or deactivating one or more tools. In the illustrative examples of FIGS. 1-3, a sliding sleeve is activated in a downhole tool.

In embodiments, the fluid exhibits favorable properties for a treatment fluid. For example, a cement spacer and has sufficient magnetic permeability for detection by the sensing apparatus 125. The base fluid system may contain water, a viscosifier, and magnetic permeability particles. Diutan gum may be used as a viscosifier, and magnetite used as the magnetic permeability particles. Rheology and solid suspension capacity may be controlled by adjusting the diutan gum concentration. The fluid system may be batched mixed or mixed on the fly at the surface. When batch mixing, the viscosifier should be yielded before adding the magnetic permeability particles. The fluid system may also contain surfactants for water-wetting, hole cleaning and compatibility. Heavy weight agents may be added to control density.

The high magnetic permeability particles may be included in the spacer dry blend in any suitable amount. In some embodiments, the spacer fluid may contain high magnetic permeability particles in an amount of about 0.1 vol % to about 40 vol % or about 0.5 vol % to about 20 vol % or about 1 vol % to about 5 vol %. In some embodiments the vol % of the magnetic permeability particles may be about 2 vol %. The magnetic permeability of the fluid is dependent upon the volume fraction of the high magnetic permeability particles in the fluid system.

In embodiments, the viscosifier may comprise polysaccharides such as xantham gum and welan gum or viscosifying clays such as, e.g., bentonite, attapulgite or hectorite. The magnetic particle may be any particle that has sufficient magnetic permeability to be detected at low concentration by the sensing apparatus 125. Suitable materials for magnetic particles may include magnetite, ilmenite, hematite, mu-metal, iron filings, powdered metal, or combination thereof. Moreover, the suitable materials may include metal 3d transition metals, such as 17-4 (SAE type 630 stainless steel) or H13 (chromium-molybdenum).

The fluids herein may comprise a cementing fluid, a spacer, a brine, a drilling fluid, or any fluid, in any practical combination, used during a well operation. One or more different fluids may be modified by adding magnetic permeability material of a pre-specified concentration. Modifying more than one type of fluid is contemplated by this disclosure.

The sensing apparatus 125 may be calibrated so that it reports a detection event upon sensing a desired level of magnetic permeability in fluid flows. The calibration may set a threshold defining a level of high magnetic permeability so that an event is generated when this level (or above) has been sensed. The event may be a continuous signal while the high magnetic permeability is being sensed. Sensed magnetic permeability below this defined threshold is considered "low permeability," for which no event is generated by the sensing apparatus 125. The calibration may be performed any time prior to deployment of the sensing apparatus 125 in a well application, perhaps using one or more fluids at particular concentrations and content that should be considered "low permeability," i.e., not causing a detection event by sensing apparatus 125 for a particular well operation. The calibration may also employ one or more fluids at particular concentrations of magnetic permeable materials or particles that should be considered "high permeability," i.e., causing a detection event by sensing apparatus 125. In this manner, a threshold level of magnetic permeability may be established for the sensing apparatus 125 for which an event is initiated indicating presence of high permeable material. The threshold may be different from one well operation to another well operation by changing the threshold level required to cause the sensing apparatus 125 to initiate an event indicative that a high magnetic permeability level has been sensed. The calibration may employ one or more fluids reflective of those fluids that are expected to be used during a particular well operation.

Low magnetic permeability fluids herein may be a fraction of the high magnetic permeability fluid, in terms of magnetic permeability. The low magnetic permeable fluids herein may have a permeability less than the high magnetic permeable fluid. As an example, the ratio of the magnetic permeability of the high magnetic permeability fluid to the low magnetic permeability fluid may be from about 1000:1 to about 2:1, from about 100:1 to about 10:1, or about 5:1 to about 2:1, including any range between each of these ranges.

Figure 6:
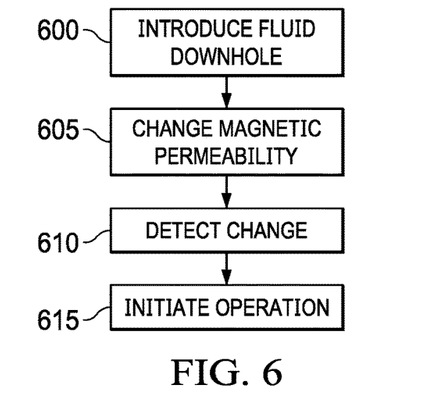
FIG. 6 is an example flow diagram of a process of using a downhole device configured according to principles of the disclosure, and the process performed according to principles of the disclosure.

FIG. 6 is an example flow diagram of a process of using a downhole device configured according to principles of the disclosure, and the process performed according to principles of the disclosure. At step 600, a fluid may be introduced downhole. For example, a fluid with a known magnetic permeability may be pumped in to a well, perhaps down the annulus, or down the well casing, depending on the specific well operation in progress. At step 605, a change may be made to the magnetic permeability property of the fluid, such as by increasing or reducing magnetic permeability material. At step 610, the sensing apparatus 125 detects the change in magnetic permeability property of the fluid. This change may exceed a detection threshold criteria that results in a signal being produced indicating that a detection threshold has been exceeded. At step 615, as a result of the detection of step 610, an event may be initiated such as to cause closing of a valve, sending a signal, closing a sliding sleeve, moving a part, starting or stopping fluid flow, starting or stopping a device, or the like.

Figure 7:
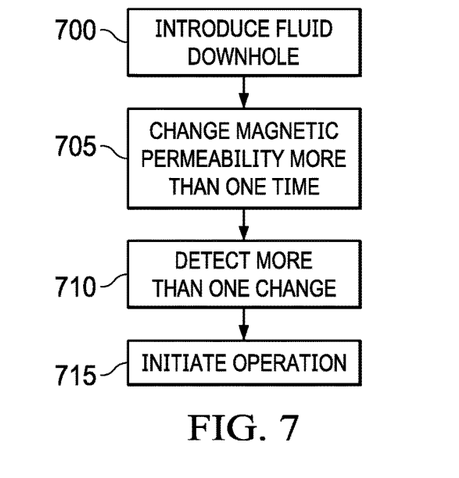
FIG. 7 is an example flow diagram of another process of using a downhole device configured according to principles of the disclosure, and the process performed according to principles of the disclosure.

FIG. 7 is an example flow diagram of another process of using a downhole device configured according to principles of the disclosure, and the process performed according to principles of the disclosure. At step 700, a fluid may be introduced downhole. For example, a fluid with a known level of magnetic permeability may be pumped into a well, perhaps down the annulus, or down the well casing, depending on the specific well operation in progress. At step 705, the level of magnetic permeability property of the fluid may be changed more than once, from a first level to a second level of magnetic permeability. This may be from high magnetic permeability material (a first criteria) to a low magnetic permeability (a second criteria) material, or conversely, more than one time. In this manner, an encoded message can be conveyed to control one or more downhole tools. At step 710, the sensing apparatus 125 detects that the more than one change in magnetic permeability property of the fluid exceeds a first detection criteria. The first detection criteria and the second detection criteria may be correlated, such as by a prior calibration process, to the expected concentration and type of magnetic material being used in an application. At step 715, as a result of the detection of step 710, one or more events may be initiated downhole based on the detection and/or the encoded message such as closing a valve, sending a signal, closing a sliding sleeve, moving a part, starting or stopping fluid flow, starting or stopping a device, or the like.

Figure 8:
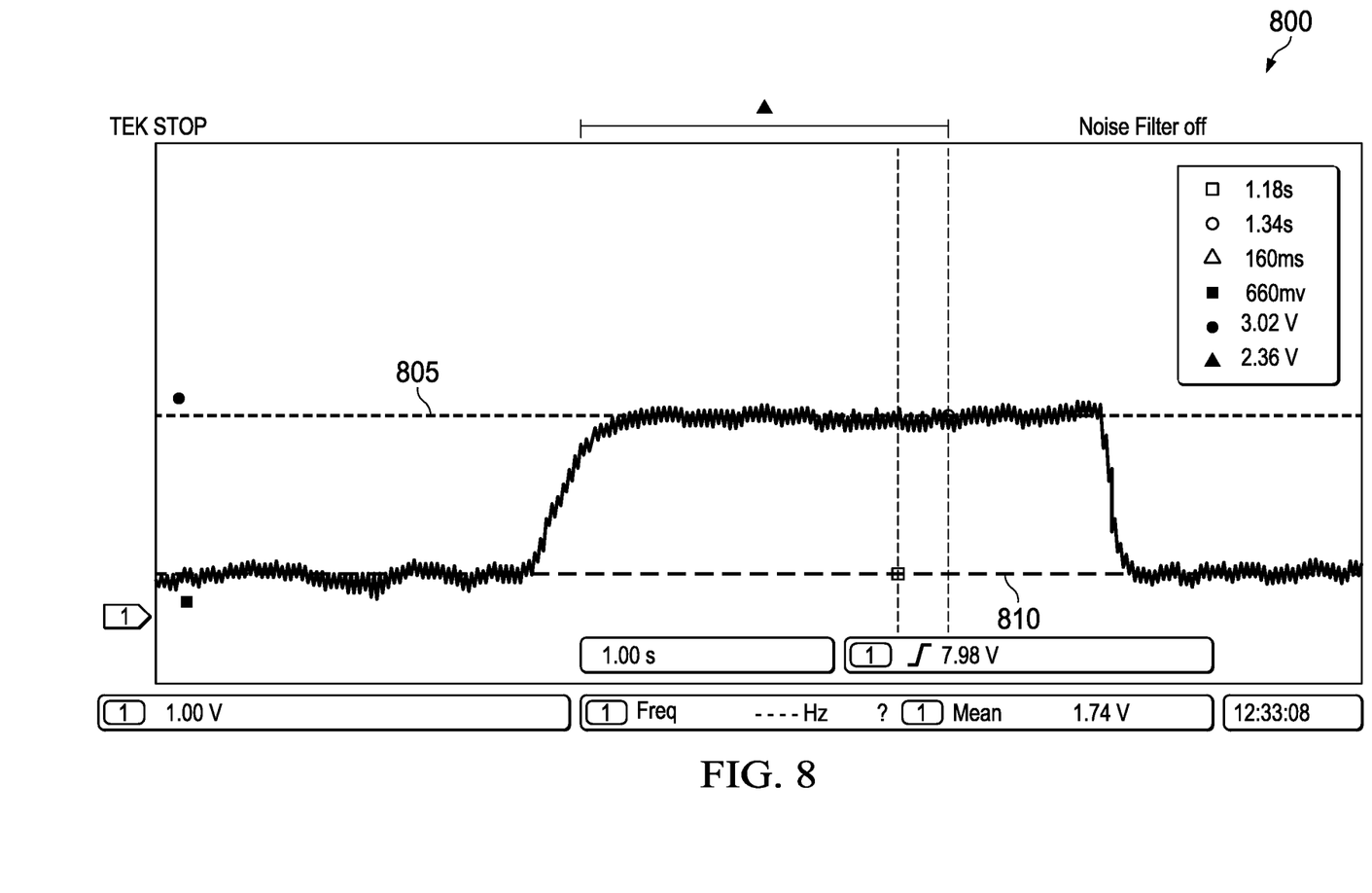
FIG. 8 is an illustration of results of lab testing, in accordance with principles of the disclosure.

FIG. 8 is an illustration of test results of a test fluid flow using a sensing apparatus as described herein with a magnetic particle of magnetite having a concentration as beads to spacer fluid 5% v/v (9 ppg), and a plug 285 thickness of 0.05", along with a casing interference as might be expected downhole. The detection of the experimental test resulted in a detection of the magnetite in the fluid flow with a measured difference of 2.36 V by the sensor apparatus.

The principles herein do not rely upon, nor need, radio frequency identification (RFID) tags. Moreover, RFID tags have low or no magnetic permeability characteristics.

The following clauses comprise one or more alternate descriptions of the various aspects of the disclosure.

Clause 1: A method comprising:
introducing a first fluid downhole in a wellbore, the first fluid having a first level of magnetic permeability;
introducing a second fluid downhole in the wellbore, the second fluid having a second level of magnetic permeability;
detecting, at a pre-positioned location in the wellbore, at least one transition from the first level of magnetic permeability to the second level of magnetic permeability; and
initiating an event downhole in response to detecting the transition.

Clause 2: The method of clause 1, wherein the first level of magnetic permeability is higher than the second level of magnetic permeability.

Clause 3: The method of clause 1, wherein the first level of magnetic permeability is lower than the second level of magnetic.

Clause 4: The method of any one of clauses 1-3, further comprising repeating each of the introducing steps to create a plurality of transitions, and the detecting step detects the plurality of transitions.

Clause 5: The method of clause 4, wherein the plurality of transitions encodes a message to cause the initiation of the event.

Clause 6: The method of any one of clauses 1-5, wherein the first fluid and the second fluid comprises a fluid separately selected from the list of: a slurry, a cementing fluid, a conditioning fluid, and a spacer fluid.

Clause 7: The method of clause 1, wherein the first fluid is a spacer fluid and the second fluid is a cement fluid.

Clause 8: The method of clause 1, wherein the first fluid is a drilling fluid and the second fluid is a spacer fluid.

Clause 9: The method of any one of clauses 1-8, wherein the step of introducing a first fluid downhole in a wellbore and the step of introducing a second fluid downhole in the wellbore comprise a reverse cementing operation.

Clause 10: The method of any one of clauses 1-9, wherein the step of detecting is performed by a magnetic sensing apparatus located in a downhole tool and the step of initiating an event prevents fluid flow from entering or exiting a down hole tool.

Clause 11: The method of any one of clauses 1-9, wherein the first fluid and second fluid are introduced into an annulus of a well.

Clause 12: The method of any one of clauses 1-11, wherein at least one of the first fluid or the second fluid comprises water, a viscosifier, a surfactant, and magnetic particles.

Clause 13: The method of clause 12, wherein the viscosifier comprises at least one member selected from the group consisting of: a polysaccharide, diutan gum, or a viscosifying clay.

Clause 14: The method of clause 12, wherein the magnetic particles comprise at least one member selected from the group consisting of magnetite, ilmenite, hematite, mu-metal, iron filings, powdered metal, maghemite, and combinations thereof.

Clause 15: A method, comprising:
  detecting one or more changes in magnetic permeability of a fluid flow in a wellbore; and
  initiating an event downhole based on the detecting to affect the fluid flow in the wellbore.

Clause 16: The method of clause 15, wherein the detected one or more changes in magnetic permeability comprises a plurality of detected changes in magnetic permeability of a fluid flow and further comprising decoding a message based on the plurality of detected changes to initiate the event.

Clause 17: The method of clauses 15 or 16, wherein the event comprises altering or stopping the fluid flow in the wellbore.

Clause 18: An apparatus, comprising:
  a sensing apparatus positionable as part of a downhole tool in a wellbore, the sensing apparatus being in operative communication with a fluid flow in the wellbore; and
  a downhole device responsive to a communication from the sensor apparatus;
  wherein the sensing apparatus is configured to detect at least one change in magnetic permeability of the fluid flow and is configured to initiate a signal to the downhole device.

Clause 19: The apparatus of clause 18, wherein the sensing apparatus is configured to detect a plurality of changes in magnetic permeability of the fluid flow before initiating the signal to the downhole device.

Clause 20: The apparatus of clause 18 or 19, wherein the downhole device is configured to stop fluid flow downhole in a reverse cementing operation and the at least one change in magnetic permeability of the fluid flow is caused by a change in concentration of magnetic particles, wherein the magnetic particles comprise at least one member selected from the group consisting of magnetite, ilmenite, hematite, maghemite, mu-metal, iron filings, powdered metal, and combinations thereof.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A method, comprising:
  detecting one or more changes in magnetic permeability of a fluid flow in a wellbore;
  reporting a continuous signal when the magnetic permeability exceeds a threshold; and
  initiating an event downhole in response to the magnetic permeability exceeding the threshold.

2. The method of claim 1, wherein the detected one or more changes in magnetic permeability comprises a plurality of detected changes in magnetic permeability of the fluid flow and further comprising decoding a message based on the plurality of detected changes to initiate the event.

3. The method of claim 1, wherein the event comprises altering or stopping the fluid flow in the wellbore.

4. An apparatus, comprising:
  a sensing apparatus positionable as part of a downhole tool in a wellbore, the sensing apparatus being in operative communication with a fluid flow in the wellbore; and
  a downhole device responsive to a communication from the sensor apparatus;
  wherein the sensing apparatus is configured to detect at least one change in magnetic permeability of the fluid flow and is configured to initiate a signal to the downhole device; wherein the signal is a continuous signal that is initiated when the magnetic permeability exceeds a threshold.

5. The apparatus of claim 4, wherein the sensing apparatus is configured to detect a plurality of changes in magnetic permeability of the fluid flow before initiating the signal to the downhole device.

6. The apparatus of claim 4, wherein the downhole device is configured to stop fluid flow downhole in a reverse cementing operation and the at least one change in magnetic permeability of the fluid flow is caused by a change in concentration of magnetic particles, wherein the magnetic particles comprise at least one member selected from the group consisting of: comprising magnetite, ilmenite, hematite, maghemite, mu-metal, iron filings, powdered metal, and combinations thereof.

7. A method comprising:
  introducing a first fluid downhole in a wellbore, the first fluid having a first level of magnetic permeability and a first fluid flow;
  introducing a second fluid downhole in the wellbore, the second fluid having a second level of magnetic permeability and a second fluid flow;

detecting, at a pre-positioned location in the wellbore, at least one transition from the first fluid to the second fluid by detecting a change from the first level of magnetic permeability in the first fluid flow to the second level of magnetic permeability in the second fluid flow;

reporting a continuous signal when either the first level of magnetic permeability or the second level of magnetic permeability exceeds a threshold; and initiating an event downhole in response to the first level of magnetic permeability or the second level of magnetic permeability exceeding the threshold.

8. The method of claim 7, wherein the first level of magnetic permeability is higher than the second level of magnetic permeability.

9. The method of claim 7, wherein the first level of magnetic permeability is lower than the second level of magnetic permeability.

10. The method of claim 7, further comprising repeating each of the introducing steps to create a plurality of transitions, and the detecting step detects the plurality of transitions.

11. The method of claim 10, wherein the plurality of transitions encodes a message to cause the initiation of the event.

12. The method of claim 7, wherein the first fluid and the second fluid comprise a fluid separately selected from the list of: a slurry, a cementing fluid, a conditioning fluid, and a spacer fluid.

13. The method of claim 7, wherein the first fluid is a spacer fluid and the second fluid is a cement fluid.

14. The method of claim 7, wherein the first fluid is a drilling fluid and the second fluid is a spacer fluid.

15. The method of claim 7, wherein the step of introducing a first fluid downhole in a wellbore and the step of introducing a second fluid downhole in the wellbore comprise a reverse cementing operation.

16. The method of claim 7, wherein the step of detecting comprises using a magnetic sensing apparatus located in a downhole tool and the step of initiating an event comprises preventing fluid flow from entering or exiting the down hole tool.

17. The method of claim 7, wherein the first fluid and second fluid are introduced into an annulus of a well.

18. The method of claim 7, wherein at least one of the first fluid or the second fluid comprises water, a viscosifier, a surfactant, and magnetic particles.

19. The method of claim 18, wherein the viscosifier comprises at least one member selected from the group consisting of: polysaccharide, diutan gum, a viscosifying clay, and combinations thereof.

20. The method of claim 18, wherein the magnetic particles comprise at least one member selected from the group consisting of: magnetite, ilmenite, hematite, mu-metal, iron filings, powdered metal, maghemite, and combinations thereof.

* * * * *